United States Patent
Hwang et al.

(10) Patent No.: US 8,391,304 B2
(45) Date of Patent: Mar. 5, 2013

(54) ETHERNET-MOST GATEWAY APPARATUS

(75) Inventors: Hyun Yong Hwang, Daejeon (KR); Tae Man Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 251 days.

(21) Appl. No.: 12/875,642

(22) Filed: Sep. 3, 2010

(65) Prior Publication Data

US 2011/0149982 A1 Jun. 23, 2011

(30) Foreign Application Priority Data

Dec. 22, 2009 (KR) ........................ 10-2009-0128750

(51) Int. Cl.
*H04L 12/28* (2006.01)
*H04L 12/56* (2006.01)
(52) U.S. Cl. ...................................... 370/401; 370/392
(58) Field of Classification Search .................. 370/389, 370/392, 400, 401
See application file for complete search history.

(56) References Cited

U.S. PATENT DOCUMENTS

| | | | |
|---|---|---|---|
| 2009/0161678 A1* | 6/2009 | Huang et al. | 370/395.5 |
| 2010/0265858 A1* | 10/2010 | Gallner et al. | 370/310 |
| 2011/0029644 A1* | 2/2011 | Gelvin et al. | 709/220 |

FOREIGN PATENT DOCUMENTS

| | | |
|---|---|---|
| KR | 10-2003-0060585 A | 7/2003 |
| KR | 10-2007-0045744 A | 5/2007 |
| KR | 10-2009-0017827 A | 2/2009 |

* cited by examiner

*Primary Examiner* — Ronald Abelson
(74) *Attorney, Agent, or Firm* — Kile Park Goekjian Reed & McManus PLLC

(57) ABSTRACT

An Ethernet-MOST gateway apparatus for exchanging data between a MOST network transferring multimedia data within a vehicle and a packet network for a computer and Internet communications. The Ethernet-MOS gateway apparatus including: an Ethernet frame interface unit connected with a packet network to transmit and receive an Ethernet frame, and converting the Ethernet frame into a MOST frame; a MOST frame interface unit connected with a MOST network to transmit and receive the MOST frame, and converting the MOST frame into the Ethernet frame; and a switch fabric connecting the Ethernet frame interface unit and the MOST frame interface unit.

16 Claims, 4 Drawing Sheets

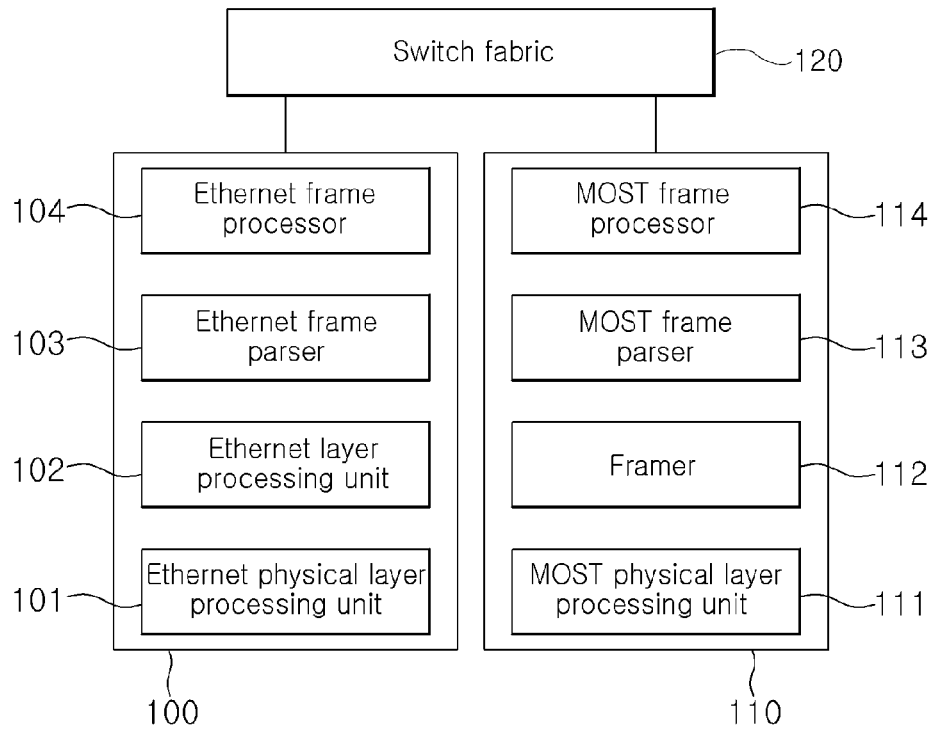
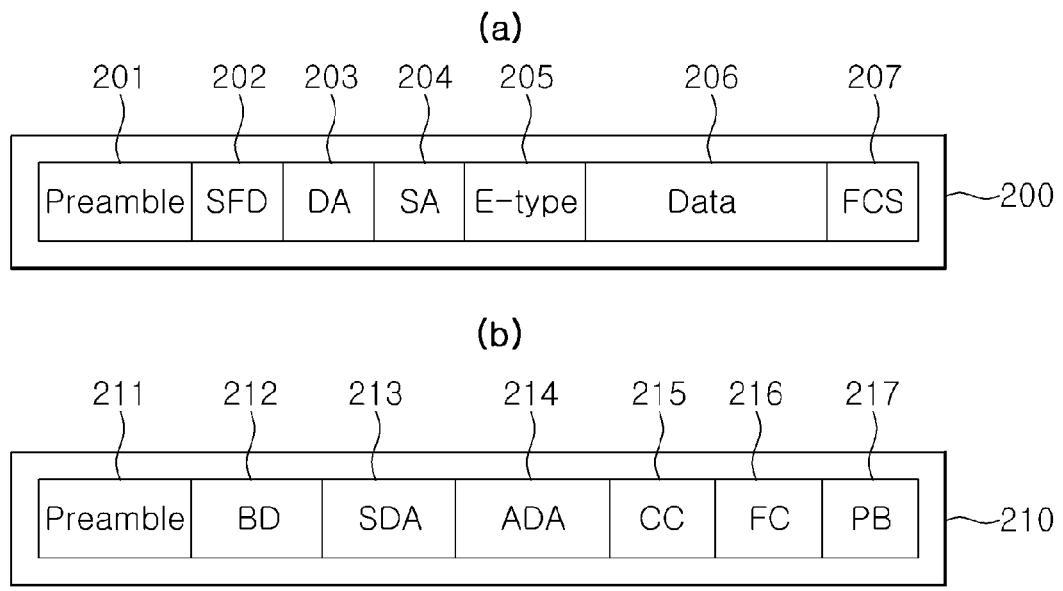
FIG. 2

ETHERNET-MOST GATEWAY APPARATUS

CROSS-REFERENCE TO RELATED APPLICATIONS

This application claims the priority of Korean Patent Application No. 10-2009-0128750 filed on Dec. 22, 2009, in the Korean Intellectual Property Office, the disclosure of which is incorporated herein by reference.

BACKGROUND OF THE INVENTION

1. Field of the Invention

The present invention relates to an Ethernet-MOST (Media Oriented System Transport) gateway apparatus and, more particularly, to an Ethernet-MOST gateway apparatus for exchanging data between a MOST network transferring multimedia data within a vehicle and a packet network for a computer and Internet communication.

2. Description of the Related Art

MOST (Media Oriented System Transport) is a communications standard for data transmission between various vehicle-based multimedia devices (e.g., a vehicle audio visual (AV) system, a navigation system, a digital versatile disc (DVD) player, a changer, an amplifier, and the like). In general, it establishes a ring-type network so as to transmit large quantities of multimedia information such as voice, video, and the like, through optical fibers at a wide bandwidth according to a high speed transmission scheme.

Packet networks are commonly employed for a LAN (Local Area Network), a WAN (Wide area network), and the like, owing to the development of high-tech equipment such as a hub, a switch, a router, and the like, as well as various types of multimedia services such as a digital broadcast, a video call, VoD (Video on Demand), IPTV (Internet Protocol Television), and the like, in concert with the explosive increase in Internet users and existing data services.

In the past, vehicles were merely transportation systems carrying human beings, things or objects from place to place; however, some contemporary vehicles are classified as infotainment (information+entertainment) systems, having information and entertainment functions in addition to their existing transportation functionality. Thus, a MOST network supporting a vehicle multimedia service must use packet network data providing general data services and novel multimedia services in order to support such Infotainment.

However, a MOST frame for transferring data in the MOST network and an Ethernet frame for transferring data in the packet network are of different frame types, so information cannot be transferred between these frames without being converted. Also, an improper use of MOST frame synchronization and asynchronization intervals makes it impossible to effectively transfer the multimedia services from the packet network thereto.

Therefore, a gateway connecting the MOST frame of the MOST network and the Ethernet frame of the packet network is required.

SUMMARY OF THE INVENTION

An aspect of the present invention provides an Ethernet-MOST (Media Oriented System Transport) gateway apparatus capable of effectively converting a frame for a data transfer between a MOST network and a packet network, and a method for processing a frame thereof.

According to an aspect of the present invention, there is provided an Ethernet-MOS gateway apparatus including: an Ethernet frame interface unit connected with a packet network so as to transmit and receive an Ethernet frame, and converting the Ethernet frame into a MOST frame; a MOST frame interface unit connected with a MOST network to transmit and receive the MOST frame, and converting the MOST frame into the Ethernet frame; and a switch fabric connecting the Ethernet frame interface unit and the MOST frame interface unit.

The Ethernet frame interface unit may include: a physical layer and MAC layer processing unit performing physical layer and MAC layer processing on the Ethernet frame; an Ethernet frame parser parsing the Ethernet frame; and an Ethernet frame processor converting the Ethernet frame which has been parsed by the Ethernet frame parser into the MOST frame when the Ethernet frame is to be transmitted to the MOST network.

The Ethernet frame processor may fragment data included in the parsed Ethernet frame, according to the length of the MOST frame, generate one or more MOST frames, each including the fragmented data, and output the same.

The Ethernet frame processor may additionally have a function of analyzing Ethernet type information included in the Ethernet frame and determining whether to use an SDA (Synchronous Data Area) or an ADA (Asynchronous Data Area) of the MOST frame.

Each of the MOST frames may include: a preamble area in which information for the synchronization of the MOST frame is stored; an SDA in which synchronous data is stored; an ADA in which asynchronous data is stored; a BD (Boundary Descriptor) area in which information for discriminating the SDA and the ADA is stored; a CC (Control Channel) area in which command, status, and diagnosis information for controlling the MOST network is stored; an FC (Frame Control) area in which information for controlling the MOST frame is stored; and a PB (Parity Bit) area in which information for detecting a MOST frame error is stored, wherein one of the SDA and the ADA stores data fragmented by the Ethernet frame processor.

The MOST frame interface unit may include: a MOST physical layer processing unit performing physical layer processing on the MOST frame; a framer framing the MOST frame to be transmitted to or received from the MOST network; a MOST frame parser parsing the MOST frame; and a MOST frame processor converting the MOST frame which has been parsed by the MOST frame parser into an Ethernet frame when the MOST frame is to be transmitted to the packet network.

The MOST frame processor may generate one or more Ethernet frames by using one or more units of synchronous data and asynchronous data included in the parsed MOST frame, and output the same.

Each of one or more of the Ethernet frames may include: a preamble area in which information for the synchronization of the Ethernet frame is stored; an SFD (Start Frame Delimiter) area in which information indicating a start of the Ethernet frame is stored; a DA (Destination Address) area in which information indicating the address of a destination is stored; an SA (Source Address) area in which information indicating the address of a source is stored; an Ethernet type (E-type) area in which information indicating that the parsed MOST frame is a frame having synchronous data or asynchronous data is stored; a data area in which the synchronous data or the asynchronous data of the parsed MOST frame is stored; and an FCS (Frame Check Sequence) area in which information for detecting an Ethernet frame error is stored.

If necessary, dummy information for adjusting the size of a minimum Ethernet frame may be additionally stored in the data area.

According to another aspect of the present invention, there is provided a method for processing a frame of an Ethernet-MOST gateway apparatus, including: receiving and parsing an Ethernet frame; determining a network to which the Ethernet frame is to be transmitted; when the Ethernet frame is to be transmitted to a MOST network, fragmenting data included in the Ethernet frame such that the fragmented data fits the length of a MOST frame; and generating one or more MOST frames, each of the one or more MOST frames including the fragmented data, and outputting the same.

The method may further include: analyzing Ethernet type information included in the Ethernet frame to determine whether to use an SDA (Synchronous Data Area) or an ADA (Asynchronous Data Area) of the MOST frame.

Each of the MOST frames may include: a preamble area in which information for the synchronization of the MOST frame is stored; an SDA in which synchronous data is stored; an ADA in which asynchronous data is stored; a BD (Boundary Descriptor) area in which information for discriminating the SDA and the ADA is stored; a CC (Control Channel) area in which command, status, and diagnosis information for controlling the MOST network is stored; an FC (Frame Control) area in which information for controlling the MOST frame is stored; and a PB (Parity Bit) area in which information for detecting a MOST frame error is stored, wherein one of the SDA and the ADA stores data fragmented by the Ethernet frame processor, instead of the synchronous data or the asynchronous data.

According to another aspect of the present invention, there is provided a method for processing a frame of an Ethernet-MOST gateway apparatus, including: receiving and parsing a MOST frame; determining a network to which the MOST frame is to be transmitted; and when the MOST frame is to be transmitted to a packet network, generating one or more Ethernet frames by using one or more units of synchronous data and asynchronous data included in the MOST frame, and outputting the same.

The generating and outputting of one or more Ethernet frames may include: generating one or more Ethernet frames by using one or more units of synchronous data and asynchronous data included in the MOST frame; and setting an E-type A or port information (UDP (User Datagram Protocol)) in the Ethernet frame which has been generated by using the synchronous data included in the MOST frame and setting an E-type B or port information (TCP (Transmission Control Protocol)) in the Ethernet frame which has been generated by using the asynchronous data included in the MOST frame.

Each of one or more of the Ethernet frames may include: a preamble area in which information for the synchronization of the Ethernet frame is stored; an SFD (Start Frame Delimiter) area in which information indicating a start of the Ethernet frame is stored; a DA (Destination Address) area in which information indicating the address of a destination is stored; an SA (Source Address) area in which information indicating the address of a source is stored; an Ethernet type (E-type) area in which information indicating that the parsed MOST frame is a frame having synchronous data or asynchronous data is stored; a data area in which the synchronous data or the asynchronous data of the parsed MOST frame is stored; and an FCS (Frame Check Sequence) area in which information for detecting an Ethernet frame error is stored.

The generating and outputting of one or more Ethernet frames may include: additionally storing dummy information for adjusting the size of a minimum Ethernet frame in the data area.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a schematic block diagram of an Ethernet-MOST gateway apparatus according to an exemplary embodiment of the present invention;

FIG. 2 illustrates the structure of a general Ethernet frame and that of a MOST frame;

DETAILED DESCRIPTION OF THE PREFERRED EMBODIMENT

Figure 3:
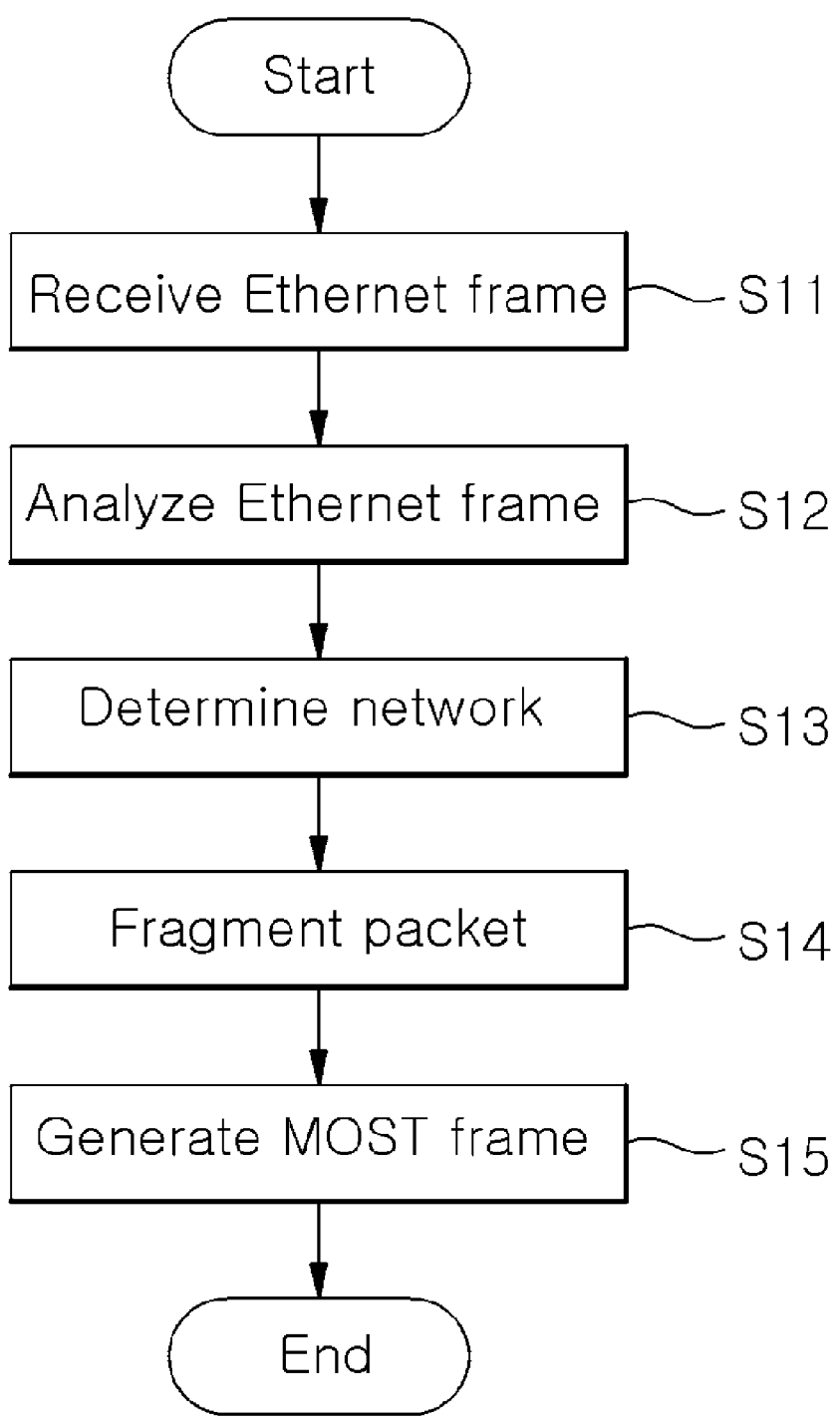
FIG. 3 is a flow chart illustrating the process of a method for processing a frame of the Ethernet-MOST gateway apparatus according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art.

In the drawings, the shapes and dimensions may be exaggerated for clarity, and the same reference numerals will be used throughout to designate the same or like components.

It will be understood that unless explicitly described to the contrary, the word "comprise" and variations such as "comprises" or "comprising," will be understood to imply the inclusion of stated elements but not the exclusion of any other elements.

FIG. 1 is a schematic block diagram of an Ethernet-MOST gateway apparatus according to an exemplary embodiment of the present invention.

With reference to FIG. 1, the Ethernet-MOST gateway apparatus according to an exemplary embodiment of the present invention includes an Ethernet frame interface unit 100 connected with a packet network to transmit and receive an Ethernet frame and converting an Ethernet frame into a MOST frame, a MOST frame interface unit 110 connected with a MOST network to transmit and receive a MOST frame and converting a MOST frame into an Ethernet frame, and a switch fabric 120 connecting the Ethernet frame interface unit 100 and the MOST frame interface unit 110, namely, the packet network and the MOST network.

The Ethernet frame interface unit 100 includes an Ethernet physical layer processing unit 101 for transmitting and receiving an Ethernet frame through a plurality of transmission/reception ports (namely, performing physical layer processing on the Ethernet frame), an Ethernet MAC layer processing unit 102 for transmitting and receiving the Ethernet frame to and from the packet network through the Ethernet physical layer processing unit 101 (namely, performing MAC layer processing on the Ethernet frame), an Ethernet frame parser 103 for parsing the Ethernet frame, and an Ethernet frame processor 104 converting the Ethernet frame, which has been parsed by the Ethernet frame parser 103, into a MOST frame when the Ethernet frame is to be transferred to the MOST frame.

The MOST frame interface unit 110 includes a MOST physical layer processing unit 111 for transmitting and receiving a MOST frame through a plurality of transmission/reception ports (namely, performing physical layer processing on the MOST frame), a framer 112 for transmitting and receiving the MOST frame to and from the MOST network through the MOST physical layer processing unit 111 (namely, performing MAC layer processing on the Ethernet frame), a MOST frame parser 113 for parsing the MOST frame, and a MOST frame processor 114 for converting the MOST frame, which has been parsed by the MOST frame parser 113, in to an Ethernet frame, when the MOST frame is to be transferred to the packet network.

FIG. 2 illustrates the structure of a general Ethernet frame and that of a MOST frame.

First, with reference to FIG. 2(*a*), an Ethernet frame 200 according to an exemplary embodiment of the present invention includes a preamble area 201 in which preamble information for the synchronization of an Ethernet frame is stored, an SFD (Start Frame Delimiter) area 202 in which information indicating a start of the Ethernet frame is stored, a DA (Destination Address) area 203 in which information indicating the address of a destination is stored, an SA (Source Address) area 204 in which information indicating the address of a source is stored, an Ethernet type (E-type) area 205 in which information regarding the type of the Ethernet frame is stored, a data area 206 in which data desired to be transmitted is stored, and an FCS (Frame Check Sequence) area 207 in which information for detecting an Ethernet frame error is stored.

With reference to FIG. 2(*b*), a MOST frame 210 includes a preamble area 211 in which preamble information for the synchronization of a MOST frame is stored, a BD (Boundary Descriptor) area 212 in which information for discriminating an SDA (Synchronous Data Area) and an ADA (Asynchronous Data Area) in the MOST frame is stored, an SDA 213 in which synchronous data desired to be transmitted is stored, an ADA 214 in which asynchronous data desired to be transmitted is stored, a CC (Control Channel) area 215 in which command, status, and diagnosis information for controlling a MOST network is stored, an FC (Frame Control) area 216 in which information for controlling the MOST frame is stored, and a PB (Parity Bit) area 217 in which information for detecting a MOST frame error is stored.

FIG. 3 is a flow chart illustrating the process of a method for processing a frame of the Ethernet-MOST gateway apparatus according to an exemplary embodiment of the present invention. For example, a case in which an Ethernet frame of the packet network is transmitted to the MOST network will be described with reference to FIG. 3.

First, in an Ethernet frame reception step S11, the Ethernet physical layer processing unit 101 and the Ethernet MAC layer processing unit 102 of the Ethernet frame interface unit 100 receive an Ethernet frame.

In an Ethernet frame analysis step S12, the Ethernet frame parser 103 of the Ethernet frame interface unit 100 extracts information from the received Ethernet frame.

In a network determining step S13, the Ethernet frame processor 104 of the Ethernet frame interface unit 100 determines which network the received Ethernet frame is to be transmitted to. Also, in the network determining step S13, the decision as to whether to transmit data by using the SDA 213 or by using the ADA 214 of the MOST frame 210 is determined by analyzing the Ethernet type information and port number (TCP/UDP (Transmission Control Protocol/User Datagram Protocol)) information.

In a packet fragmentation step S14, when the received Ethernet frame is to be transmitted to the MOST network, the Ethernet frame processor 104 of the Ethernet frame interface unit 100 fragments data of the received Ethernet frame such that it fits the length of the MOST frame.

In a MOST frame generation step S15, when the received Ethernet frame is a synchronous data-stored frame, the Ethernet frame processor 104 of the Ethernet frame interface unit 100 transmits each of the units of data fragmented in the packet fragmentation step S14 by using the SDA 213 of the MOST frame. Meanwhile, when the received Ethernet frame is an asynchronous data-stored frame, the Ethernet frame processor 104 of the Ethernet frame interface unit 100 transmits each of the units of data fragmented in the packet fragmentation step S14 by using the ADA 214.

Figure 4:
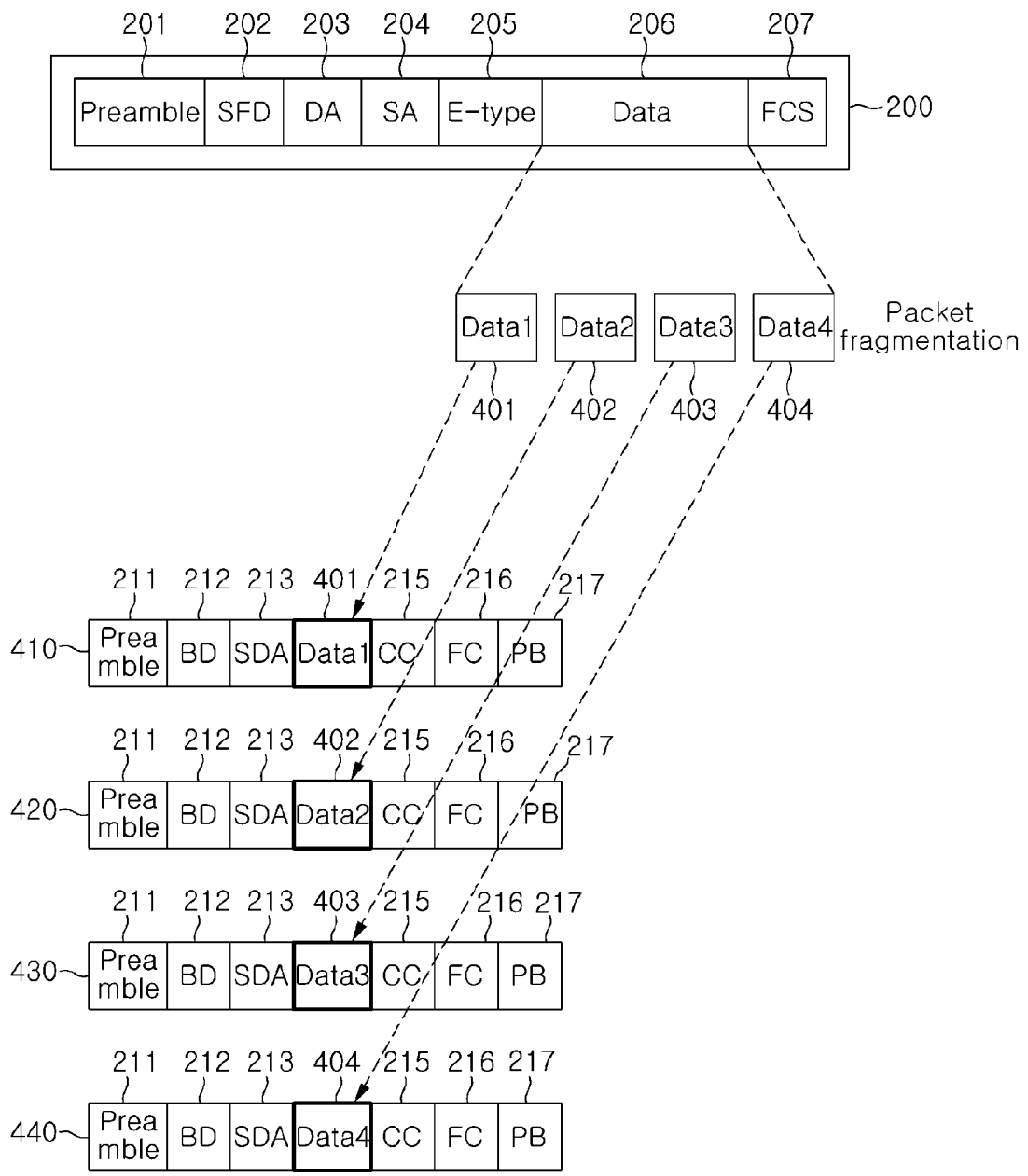
FIG. 4 illustrates the process of receiving an Ethernet frame by the Ethernet-MOST gateway apparatus from a packet network and generating a MOST frame to be transmitted to a MOST network according to an exemplary embodiment of the present invention.

FIG. 4 illustrates the process of the Ethernet-MOST gateway apparatus receiving an Ethernet frame from the packet network and generating a MOST frame to be transmitted to the MOST network according to an exemplary embodiment of the present invention.

In FIG. 4, it is assumed that the Ethernet frame 200 is transmitted to the MOST network and is a frame in which asynchronous data is stored, for the sake of brevity.

First, because the amount of data that can be transmitted by the MOST frame is limited, data 206 of the Ethernet frame 200, received from the packet network, is fragmented into units of data Data1 401, Data2 402, Data3 403, and Data4 404.

The Ethernet-MOST gateway apparatus inserts the fragmented units of data Data1 401, Data2 402, Data3 403, and Data4 404 into the ADA 214 of the MOST frame 210 in order to generate a first MOST frame 410, a second MOST frame 420, a third MOST frame 430, and a fourth MOST frame 440, and transmits them to the MOST network.

The first MOST frame 410 includes the preamble area 211, the BD area 212, the SDA 213, the Data1 area 401, the CC area 215, the FC area 216, and the PB area 217. The second MOST frame 420 includes the preamble area 211, the BD area 212, the SDA 213, the Data2 area 402, the CC area 215, the FC area 216, and the PB area 217. The third MOST frame 430 includes the preamble area 211, the BD area 212, the SDA 213, the Data3 area 403, the CC area 215, the FC area 216, and the PB area 217. The fourth MOST frame 440 includes the preamble area 211, the BD area 212, the SDA 213, the Data4 area 404, the CC area 215, the FC area 216, and the PB area 217.

Figure 5:
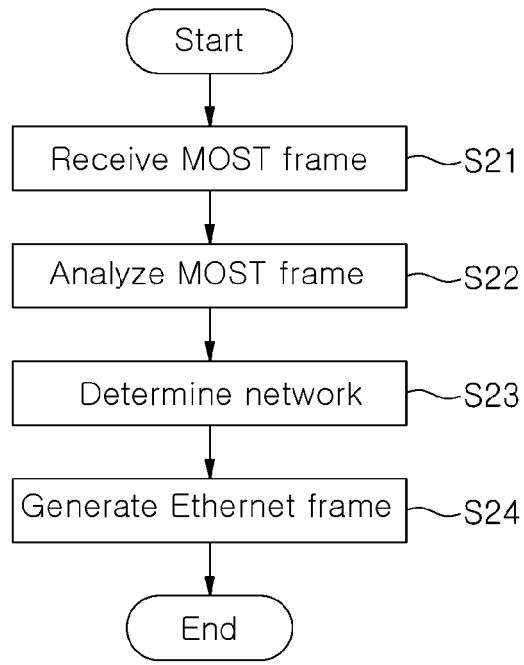
FIG. 5 is a flow chart illustrating the process of a method for processing a frame of the Ethernet-MOST gateway apparatus according to an exemplary embodiment of the present invention.

FIG. 5 is a flow chart illustrating the process of a method for processing a frame of the Ethernet-MOST gateway apparatus according to an exemplary embodiment of the present invention. For example, a case in which a MOST frame of the MOST network is transmitted to the packet network will be described.

First, in a MOST frame reception step S21, the Ethernet physical layer processing unit 111 and the framer 112 of the MOST frame interface unit 110 receive the MOST frame.

In a MOST frame analysis step S22, the MOST frame parser 113 of the MOST frame interface unit 110 extracts information of the received MOST frame.

In a network determining step S23, the MOST frame processor 114 of the MOST frame interface unit 110 determines to which network the received MOST frame is to be transmitted.

An Ethernet frame generation step S24, the MOST frame processor 114 of the MOST frame interface unit 110 transmits SDA 213 data of the received MOST frame 210 by using Data 206 of the Ethernet frame 200. Also, the MOST frame processor 114 of the MOST frame interface unit 110 transmits ADA 214 of the received MOST frame 210 by using Data 206 of the Ethernet frame 200. In addition, in the Ethernet frame generation step S24, in the case of a synchronous frame, a corresponding E-type A or port information (UDP) unit of data is additionally set and transmitted, and in case of an asynchronous frame, a corresponding E-type B or port information (TCP) unit of data is additionally set and transmitted.

Figure 6:
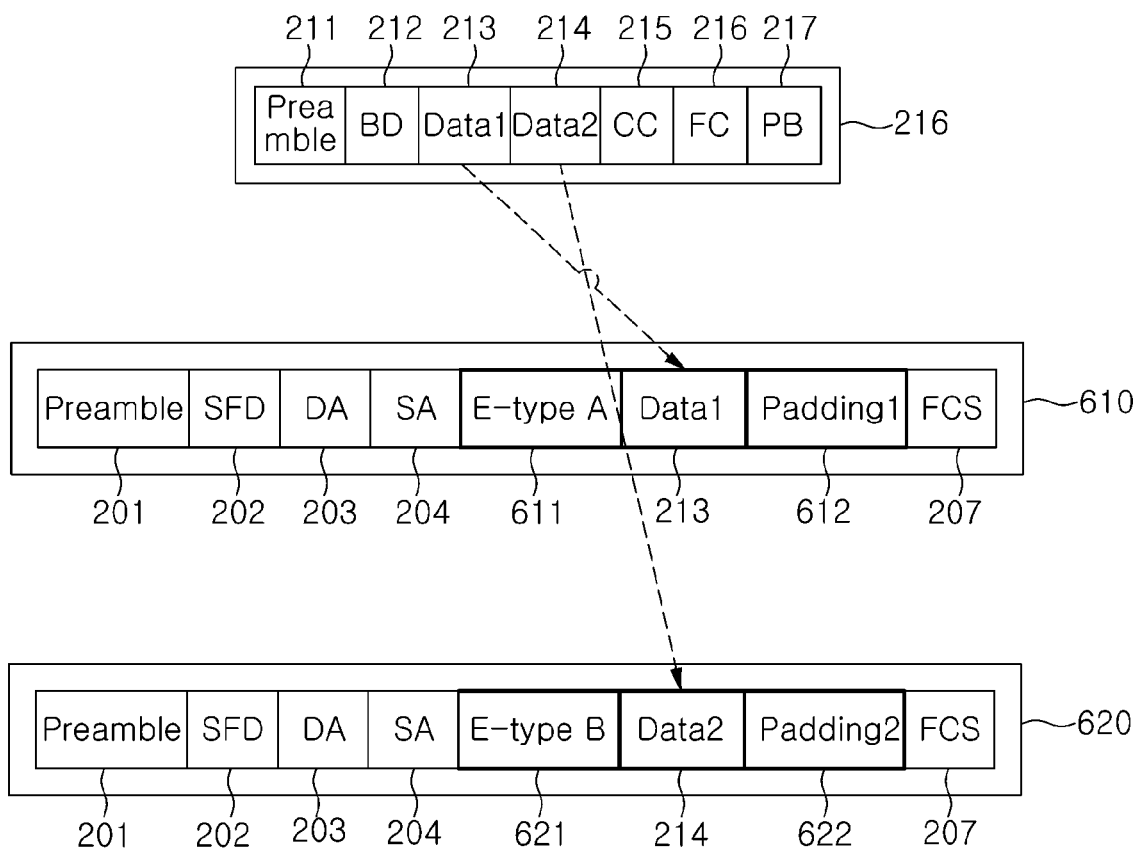
FIG. 6 illustrates the process of receiving a MOST frame by the Ethernet-MOST gateway apparatus from the MOST network and generating an Ethernet frame to be transmitted to the packet network according to another exemplary embodiment of the present invention.

FIG. 6 illustrates the process of the Ethernet-MOST gateway apparatus receiving a MOST frame from the MOST network and generating an Ethernet frame to be transmitted to the packet network according to another exemplary embodiment of the present invention.

In FIG. 6, it is assumed that a MOST frame received from the MOST network is transmitted to the packet network and both asynchronous data units and synchronous data units exist in the frame, for the sake of brevity.

The Ethernet-MOST gateway apparatus generates first and second Ethernet frames 610 and 620 by using the synchronous data Data1 and asynchronous data Data2 stored in the SDA 213 and ADA 214 of the received MOST frame 210.

If the synchronous units of data Data1 213 and asynchronous data Data2 214 are too small to satisfy a minimum Ethernet size, a first padding unit of dummy information 612 (Padding1) and a second padding unit of dummy information 622 (Padding2) may be inserted, respectively, in order to satisfy the minimum Ethernet size.

Also, in order to signify that the frame is the Ethernet frame including the asynchronous data in the packet network, E-type 611, an exclusive Ethernet-type, may be used, and in order to signify that the frame is the Ethernet frame including the synchronous data, E-type B 621, an exclusive Ethernet-type, may be used.

Namely, the Ethernet-MOST gateway apparatus according to an exemplary embodiment of the present invention receives the MOST frame 210 including the synchronous data Data1 and the asynchronous data Data2, generates two Ethernet frames 610 and 620, and outputs the generated Ethernet frames 610 and 620 to the packet network.

The first Ethernet frame 610 includes the preamble area 201, the SFD area 202, the DA area 203, the SA 204, the E-type area 611, the Data1 area 213, the Padding1 area 612, the FCS area 207. The second Ethernet frame 620 includes the preamble area 201, the SFD area 202, the DA area 203, the SA 204, the E-type area 611, the Data1 area 213, the Padding2 area 622, the FCS area 207.

As set forth above, according to exemplary embodiments of the invention, the Ethernet-MOST gateway apparatus is able to convert an Ethernet frame transmitting data in a packet network into a MOST frame transmitting data in a MOST network, infotainment can be supported by using various types of asynchronous and synchronous data. Also, when the MOST frame transmitting data in the MOST network is converted into the Ethernet frame transmitting data in the packet network, synchronous data and asynchronous data are discriminately marked by using E-type or port number information, thus making it possible to process data while maintaining its characteristics.

While the present invention has been shown and described in connection with the exemplary embodiments, it will be apparent to those skilled in the art that modifications and variations can be made without departing from the spirit and scope of the invention as defined by the appended claims.

What is claimed is:

1. An Ethernet-MOST gateway apparatus comprising:
    an Ethernet frame interface unit connected with a packet network so as to transmit and receive Ethernet frames, and configured to convert a first Ethernet frame into multiple MOST frames;
    a MOST frame interface unit connected with a MOST network to transmit and receive MOST frames, and configured to convert a MOST frame into at least one Ethernet frame; and
    a switch fabric connecting the Ethernet frame interface unit and the MOST frame interface unit,
    wherein the Ethernet frame interface unit converts the first Ethernet frame into the multiple MOST frames by:
        fragmenting data included in the first Ethernet frame into a first data unit and a second data unit, and
        generating a first MOST frame and a second MOST frame such that the first MOST frame comprises the first data unit and the second MOST frame comprises the second data unit.

2. The apparatus of claim 1, wherein the Ethernet frame interface unit comprises:
    a physical layer and MAC layer processing unit configured to perform physical layer and MAC layer processing on the first Ethernet frame;
    an Ethernet frame parser configured to parse the first Ethernet frame; and
    an Ethernet frame processor configured to convert the first Ethernet frame which has been parsed by the Ethernet frame parser into the multiple MOST frames when the first Ethernet frame is to be transmitted to the MOST network.

3. The apparatus of claim 2, wherein the Ethernet frame processor is configured to fragment the data included in the parsed first Ethernet frame according to the length of the first MOST frame.

4. The apparatus of claim 3, wherein the Ethernet frame processor additionally has a function of analyzing Ethernet type information included in the first Ethernet frame and determining whether to use an SDA (Synchronous Data Area) or an ADA (Asynchronous Data Area) of the first MOST frame.

5. The apparatus of claim 4, wherein each of the MOST frames comprises:
    a preamble area in which information for the synchronization of the MOST frame is stored;
    an SDA in which synchronous data is stored;
    an ADA in which asynchronous data is stored;
    a BD (Boundary Descriptor) area in which information for discriminating the SDA and the ADA is stored;
    a CC (Control Channel) area in which command, status, and diagnosis information for controlling the MOST network is stored;

an FC (Frame Control) area in which information for controlling the MOST frame is stored; and a PB (Parity Bit) area in which information for detecting a MOST frame error is stored, wherein one of the SDA and the ADA stores data fragmented by the Ethernet frame processor.

6. The apparatus of claim 1, wherein the MOST frame interface unit comprises:

a MOST physical layer processing unit configured to perform physical layer processing on the MOST frame;

a framer configured to frame the MOST frame to be transmitted to or received from the MOST network;

a MOST frame parser configured to parse the MOST frame; and a MOST frame processor configured to convert the MOST frame which has been parsed by the MOST frame parser into the at least one Ethernet frame when the MOST frame is to be transmitted to the packet network.

7. The apparatus of claim 6, wherein the MOST frame processor is configured to generate one or more Ethernet frames by using one or more units of synchronous data and asynchronous data included in one or more parsed MOST frames, and to output the same.

8. The apparatus of claim 7, wherein each of the Ethernet frames comprises:

a preamble area in which information for the synchronization of the Ethernet frame is stored;

an SFD (Start Frame Delimiter) area in which information indicating a start of the Ethernet frame is stored;

an SA (Source Address) area in which information indicating the address of a source is stored;

an Ethernet type (E-type) area in which information indicating that the parsed MOST frame is a frame having synchronous data or asynchronous data is stored;

a data area in which the synchronous data or the asynchronous data of the parsed MOST frame is stored; and an FCS (Frame Check Sequence) area in which information for detecting an Ethernet frame error is stored.

9. The apparatus of claim 8, wherein dummy information for adjusting the size of a minimum Ethernet frame is additionally stored in the data area.

10. A method for processing a frame of an Ethernet-MOST gateway apparatus, the method comprising:

receiving and parsing an Ethernet frame;

determining a network to which the Ethernet frame is to be transmitted;

when the Ethernet frame is to be transmitted to a MOST network, fragmenting data included in the Ethernet frame into a first data unit and a second data unit, and such that the first data unit or the second data unit fits the length of a MOST frame; and generating a first MOST frame and a second MOST frame such that the first MOST frame comprises the first data unit and the second MOST frame comprises the second data unit, and outputting the same.

11. The method of claim 10, further comprising:

analyzing Ethernet type information included in the Ethernet frame to determine whether to use an SDA (Synchronous Data Area) or an ADA (Asynchronous Data Area) of the first MOST frame.

12. The method of claim 11, wherein each of the MOST frames comprises:

a preamble area in which information for the synchronization of the MOST frame is stored;

an SDA in which synchronous data is stored;

an ADA in which asynchronous data is stored;

a BD (Boundary Descriptor) area in which information for discriminating the SDA and the ADA is stored;

a CC (Control Channel) area in which command, status, and diagnosis information for controlling the MOST network is stored;

an FC (Frame Control) area in which information for controlling the MOST frame is stored; and a PB (Parity Bit) area in which information for detecting a MOST frame error is stored, wherein one of the SDA and the ADA stores data fragmented by the Ethernet frame processor, instead of the synchronous data or the asynchronous data.

13. A method for processing a frame of an Ethernet-MOST gateway apparatus, the method comprising:

receiving and parsing a MOST frame;

determining a network to which the MOST frame is to be transmitted; and when the MOST frame is to be transmitted to a packet network, generating a first Ethernet frame that comprises a first data unit of synchronous data included in the MOST frame and a second Ethernet frame that comprises a second data unit of asynchronous data included in the MOST frame, and outputting the same.

14. The method of claim 13, wherein the generating and outputting the Ethernet frames comprises:

setting an E-type A or port information (UDP (User Datagram Protocol)) in the first Ethernet frame which has been generated by using the synchronous data included in the MOST frame and setting an E-type B or port information (TCP (Transmission Control Protocol)) in the second Ethernet frame which has been generated by using the asynchronous data included in the MOST frame.

15. The method of claim 14, wherein each of the Ethernet frames comprises:

a preamble area in which information for the synchronization of the Ethernet frame is stored;

an SFD (Start Frame Delimiter) area in which information indicating a start of the Ethernet frame is stored;

a DA (Destination Address) area in which information indicating the address of a destination is stored;

an SA (Source Address) area in which information indicating the address of a source is stored;

an Ethernet type (E-type) area in which information indicating that the parsed MOST frame is a frame having synchronous data or asynchronous data is stored;

a data area in which the synchronous data or the asynchronous data of the parsed MOST frame is stored; and an FCS (Frame Check Sequence) area in which information for detecting an Ethernet frame error is stored.

16. The method of claim 15, wherein the generating and outputting the Ethernet frames comprises:

additionally storing dummy information for adjusting the size of a minimum Ethernet frame in the data area.

* * * * *